United States Patent
Lewis et al.

(10) Patent No.: US 12,520,970 B2
(45) Date of Patent: Jan. 13, 2026

(54) BOWL SUPPORT FOR A STAND MIXER

(71) Applicant: Haier US Appliance Solutions, Inc., Wilmington, DE (US)

(72) Inventors: Eric Matthew Lewis, Louisville, KY (US); Tomas Garces, Louisville, KY (US); Matthew R. Hunter, Louisville, KY (US); Danister Abeygunawardana, Jeffersonville, IN (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 677 days.

(21) Appl. No.: 17/887,058

(22) Filed: Aug. 12, 2022

(65) Prior Publication Data

US 2024/0049919 A1  Feb. 15, 2024

(51) Int. Cl.
*A47J 43/00* (2006.01)
*A47J 43/044* (2006.01)
*A47J 43/07* (2006.01)

(52) U.S. Cl.
CPC ......... *A47J 43/0727* (2013.01); *A47J 43/044* (2013.01); *A47J 2043/04463* (2013.01)

(58) Field of Classification Search
CPC .................. A47J 43/0727; A47J 43/044; A47J 2043/04463
See application file for complete search history.

(56) References Cited

U.S. PATENT DOCUMENTS

| 5,547,278 | A | 8/1996 | Xie |
| 7,438,463 | B2 | 10/2008 | Schnipke et al. |
| 2008/0291776 | A1* | 11/2008 | Brunswick ............ B01F 27/805 366/331 |
| 2019/0150667 | A1* | 5/2019 | Jones ..................... B01F 27/805 |
| 2019/0191718 | A1* | 6/2019 | Kesig .................. B01F 35/6052 |

FOREIGN PATENT DOCUMENTS

GB        311696 A       2/1930

\* cited by examiner

*Primary Examiner* — Anshu Bhatia
(74) *Attorney, Agent, or Firm* — Dority & Manning, P.A.

(57) ABSTRACT

A stand mixer includes a securing apparatus configured to retain a bowl on a stand mixer, the securing apparatus incudes a leaf spring mounted to a bowl support at a first end portion of the leaf spring. The leaf spring extends away from the column to a second end portion of the leaf spring and defines a receiving orifice at the second end portion of the leaf spring. A retractor is configured to translate a bolt away from the second end portion of the leaf spring when a bowl support is in the nonmixing position. An extender is configured to translate the bolt toward the second end portion of the leaf spring when the bowl support is in the mixing position.

15 Claims, 4 Drawing Sheets

BOWL SUPPORT FOR A STAND MIXER

FIELD OF THE INVENTION

The present disclosure relates generally to bowl supports for stand mixers.

BACKGROUND OF THE INVENTION

Stand mixers generally include a support for mounting a bowl on the stand mixer during operation. However, in conventional stand mixer, the bowl can be loosely mounted on the stand mixer and can shift during mixing. A stand mixer with features for easily and/or efficiently mounting a bowl on a stand mixer to eliminate shifting of the bowl during operation would be useful.

BRIEF DESCRIPTION OF THE INVENTION

Example aspects of the present subject matter provide a stand mixer with features for securely mounting a bowl on the stand mixer. Advantageously, such features can securely mount the bowl on a bowl support in an easy and/or efficient manner. Aspects and advantages of the invention will be set forth in part in the following description, may be apparent from the description, or may be learned through practice of the invention.

In one example aspect, a stand mixer includes a bowl, a column, and a bowl support. The bowl support is mounted to the column such that the bowl support is vertically translatable on the column from a nonmixing position to a mixing position. A securing apparatus is configured to retain the bowl on the stand mixer. The securing apparatus includes a leaf spring mounted to the bowl support at a first end portion of the leaf spring. The leaf spring extends away from the column to a second end portion of the leaf spring. The leaf spring defines a receiving orifice at the second end portion of the leaf spring. The receiving orifice is configured for receipt of a bowl retention protuberance of the bowl. A bolt is mounted on the bowl support proximate the second end portion of the leaf spring. The bolt is translatable relative to the leaf spring. A retractor is configured to translate the bolt away from the second end portion of the leaf spring when the bowl support is in the nonmixing position. An extender is configured to translate the bolt toward the second end portion of the leaf spring when the bowl support is in the mixing position. The extender is configured to position the bolt such that the bolt blocks deformation of the second end portion of the leaf spring.

In another example aspect, a method for retaining a bowl on a stand mixer is provided. A bowl support of the stand mixer is mounted to a column such that the bowl support is vertically translatable on the column from a nonmixing position to a mixing position. A leaf spring of a securing apparatus is mounted to the bowl support at a first end portion of the leaf spring. The leaf spring extends away from the column to a second end portion of the leaf spring. The leaf spring defines a receiving orifice at the second end portion of the leaf spring. The receiving orifice is configured for receipt of a bowl retention protuberance of the bowl. A bolt of the securing apparatus is mounted on the bowl support proximate the second end portion of the leaf spring. The bolt is translatable relative to the leaf spring. The method includes: placing the bowl with the bowl retention protuberance on the bowl support when the bowl support is in the nonmixing position such that the receiving orifice receives the bowl retention protuberance; translating the bowl support to the mixing position; and, as the bowl support translates to the mixing position, engaging an extender such that the bolt translates toward the second end portion of the leaf spring in order and blocks deformation of the second end portion of the leaf spring.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
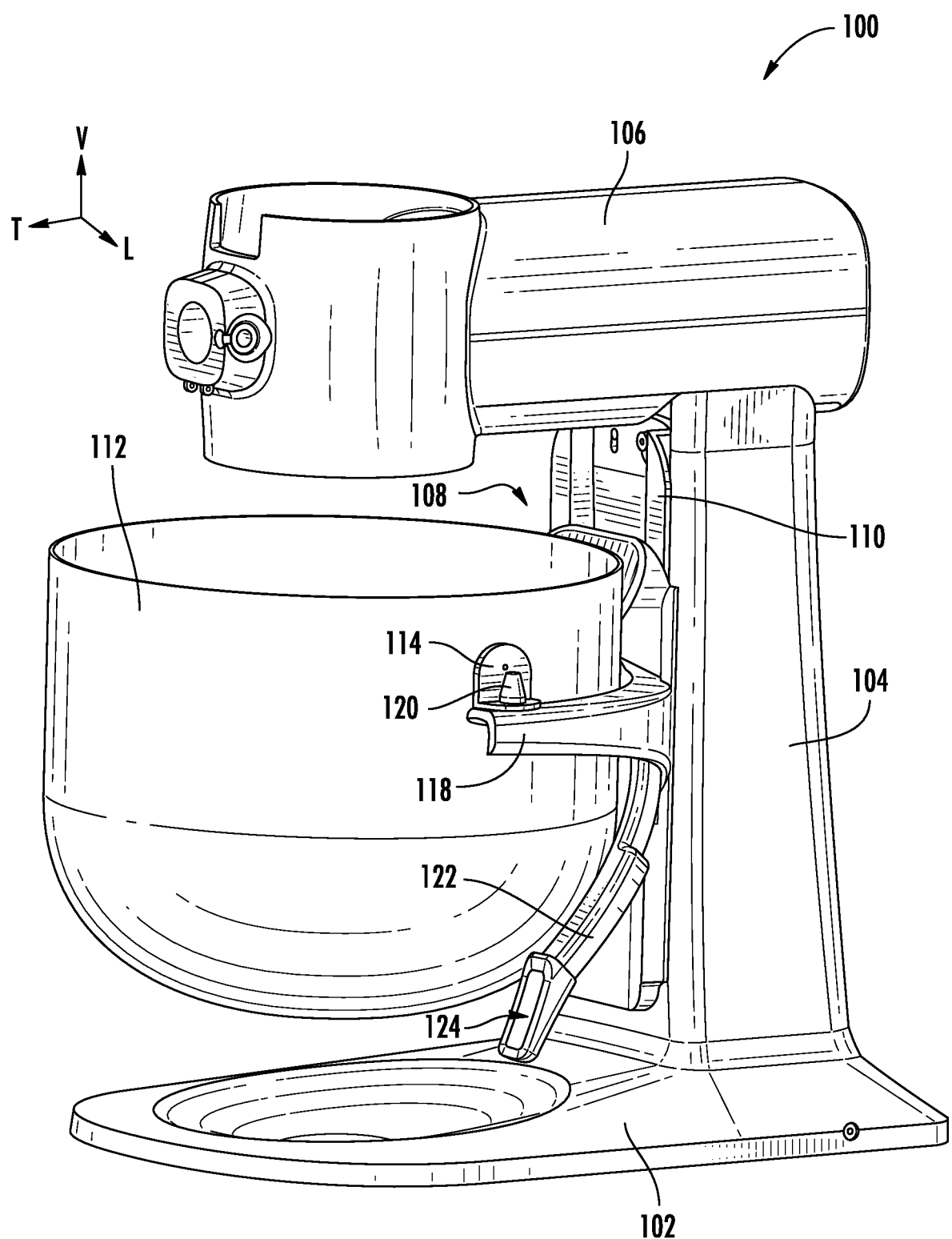
FIG. 1 is an isometric perspective view of an example embodiment of a stand mixer of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

FIG. 1 provides an isometric view of a stand mixer 100 according to an example embodiment of the present subject matter. It will be understood that stand mixer 100 is provided by way of example only and that the present subject matter may be used in or with any suitable stand mixer in alternative example embodiments. Moreover, with reference to each of FIGS. 1 and 2, stand mixer 100 may define a vertical direction V, a lateral direction L, and a transverse direction T, which are mutually perpendicular and form an orthogonal direction system. It should be understood that these directions are presented for example purposes only, and that relative positions and locations of certain aspects of stand mixer 100 may vary according to specific embodiments, spatial placement, or the like.

Stand mixer 100 may include a base 102 and a support post or column 104. The support column 104 may support a mixer head 106, which is positioned atop column 104. The mixing head 106 may house a motor, a gearbox, and/or a drivetrain apparatus (not shown) of stand mixer 100. For example, as shown in FIG. 1, head 106 may be mounted to column 104, which is mounted to base 102. Thus, column 104 may extend between and connect base 102 and head 106, e.g., along the vertical direction V. Head 106 may extend outwardly above the base 102, e.g., in the transverse direction T. Column 104 may also include a bowl support 108. Bowl support 108 may slidably mount to a column rail 110, which is mounted to column 104. Additionally, components of bowl support 108 may extend outwardly above the base 102, e.g., in the transverse direction T, and may hold bowl 112 above base 102, e.g., along the vertical direction V. Bowl 112 may be removably mounted on bowl support 108 via flanges 114. Flanges 114 may be on opposite sides of the bowl 112 with respect to the circumference of the bowl. Bowl support 108 will be described in further detail herein.

Example operation of an exemplary embodiment of the stand mixer 100 of the present disclosure is described below. In the operation of stand mixer 100, a user may load food items into bowl 112. The food items may be ingredients, such as flour, water, milk, etc. These items are provided for example purposes only and one skilled in the art would appreciate that there are many more types of food items that may be placed in bowl 112 of stand mixer 100. After loading the food items into bowl 112, a user may turn on a motor to begin the process of mixing, kneading, beating, etc. The motor rotates an attachment attached to stand mixer 100 to complete each of these processes. The processes may be conducted with a respective attachment such as a mixer blade for mixing, a dough hook for kneading, and a balloon whisk for beating.

As shown in FIG. 1, bowl support 108 may include an arm 118, with a mounting spike 120. Arm 118 may hold bowl 112 via mounting spike 120, which may removably couple to flanges 114. For instance, each mounting spike 120 on arm 118 may be received within a respective flange 114 on bowl 112. Lift lever 122 may rotatably couple to arm 118. There may be at least two lift levers 122. Thus, bowl 112 may be disposed between lift levers 122, e.g., along the lateral direction L. Each lift lever 122 may be positioned on a respective side of bowl 112, such that both a left-handed user and a right-handed user may comfortably operate lift levers 122. Lift lever 122 may have one end 124 cantilevered from support column 104. Such distal end 124 may correspond to a handle for a user to grasp, push, or pull.

Figure 2:
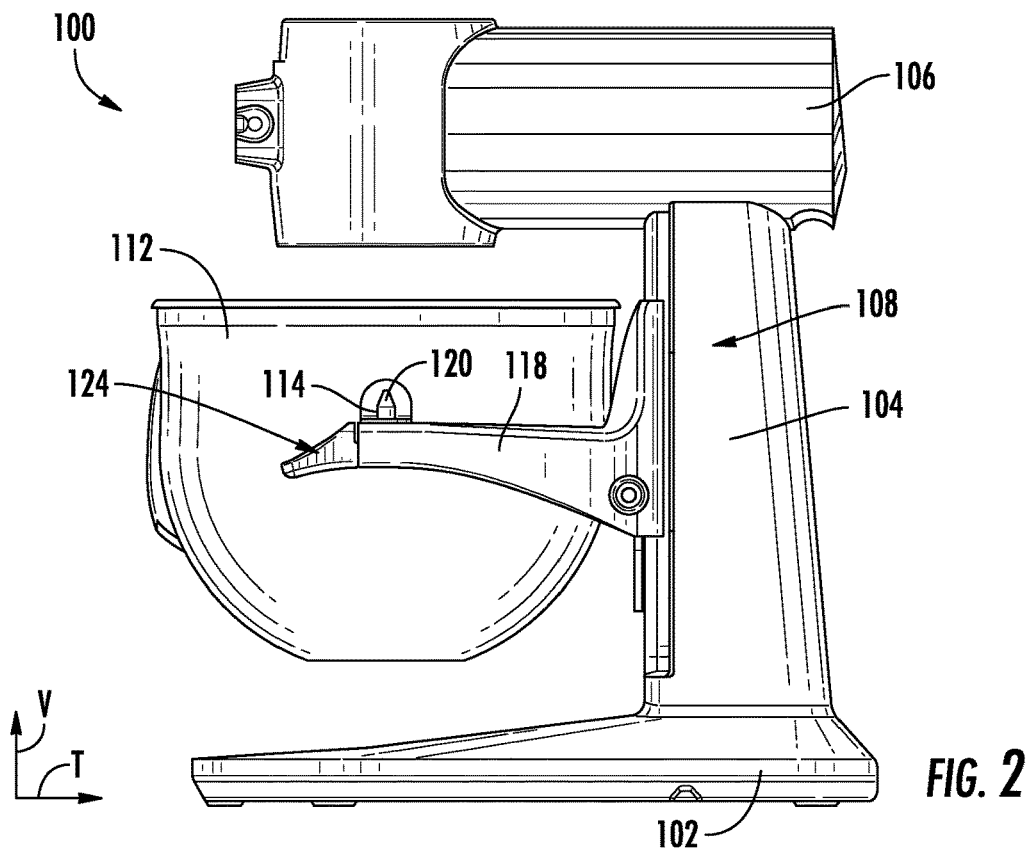
FIG. 2 is a side, elevation view of the example stand mixer of FIG. 1 with a bowl of the example stand mixer shown in an up or mixing position.
Figure 3:
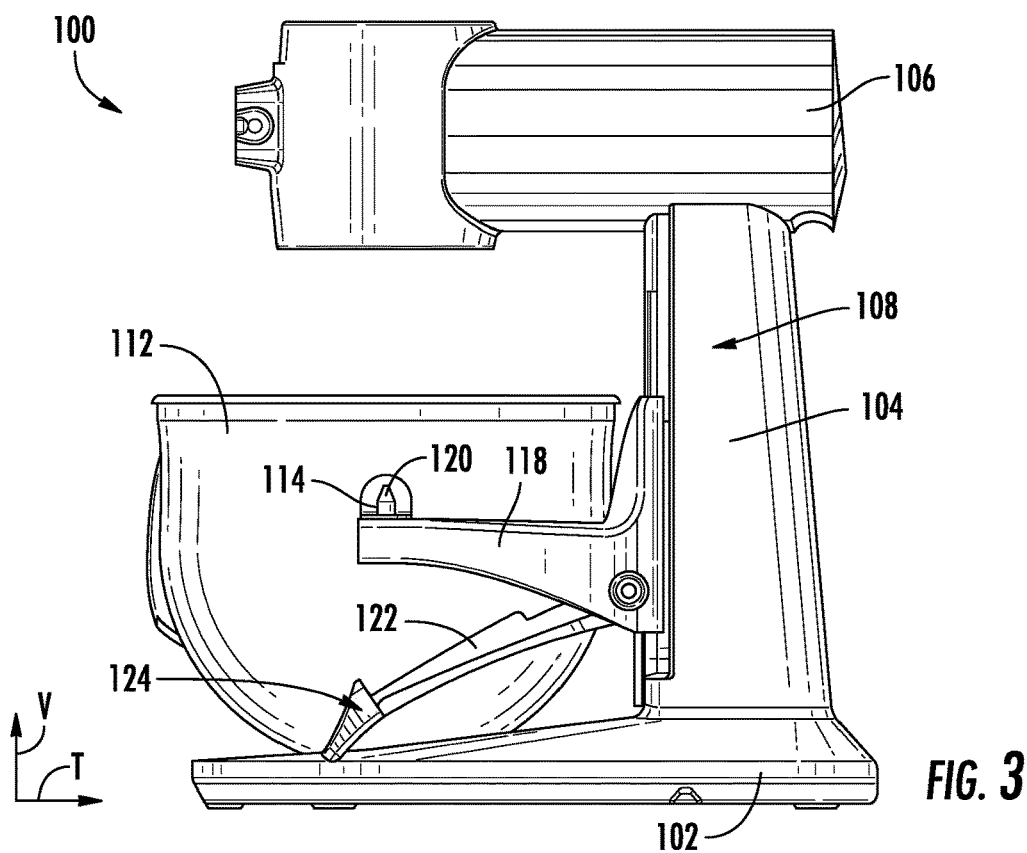
FIG. 3 is a side, elevation view of the example stand mixer of FIG. 1 with the bowl of the example stand mixer shown in a down or non-mixing position.

Referring now to FIGS. 1 and 3, in a first position, otherwise called a down position or non-mixing position, bowl 112 may be lowered into contact with base 102 of stand mixer 100, or proximate above base 102. In the first position, lift lever 122 is disengaged, angled downward toward base 102. Bowl 112 may be in the first position so that there is more space between bowl 112 and head 106 such that ingredients may be added to the bowl 112. Referring now to FIG. 2, in a second position, otherwise referred to as an up position or mixing position, bowl 112 may be elevated vertically from base 102 of stand mixer 100 when lift lever 122 is actuated. For example, when lift lever 122 is actuated, a user rotates lift lever 122 to a horizontal position, as seen in FIG. 2. When bowl 112 is raised, e.g., along the vertical direction V, from base 102, bowl 112 is positioned closer to head 106 for stand mixer 100 to mix the contents of bowl 112.

Figure 4:
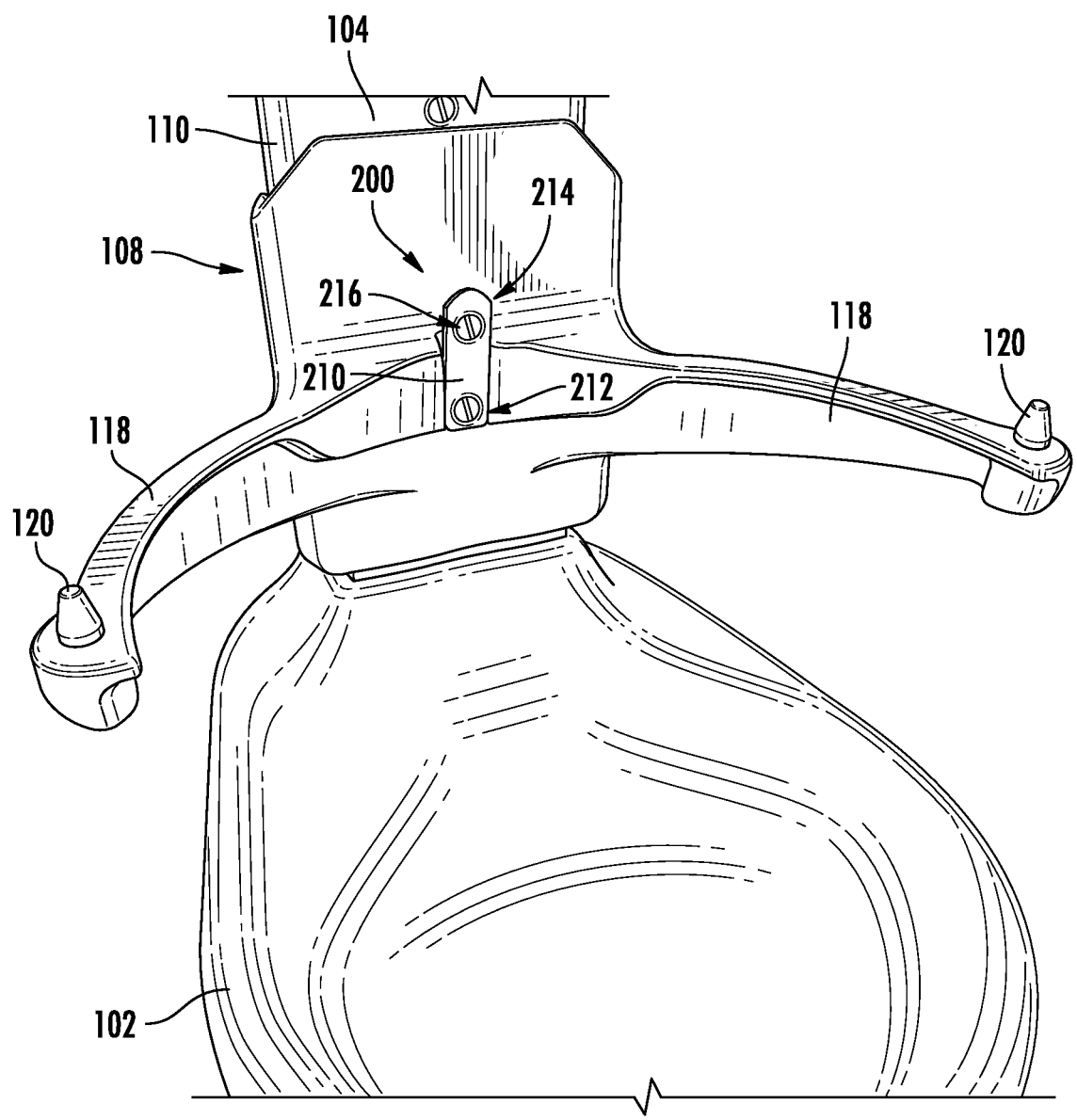
FIG. 4 is a partial, perspective view of the example stand mixer of FIG. 1.
Figure 5:
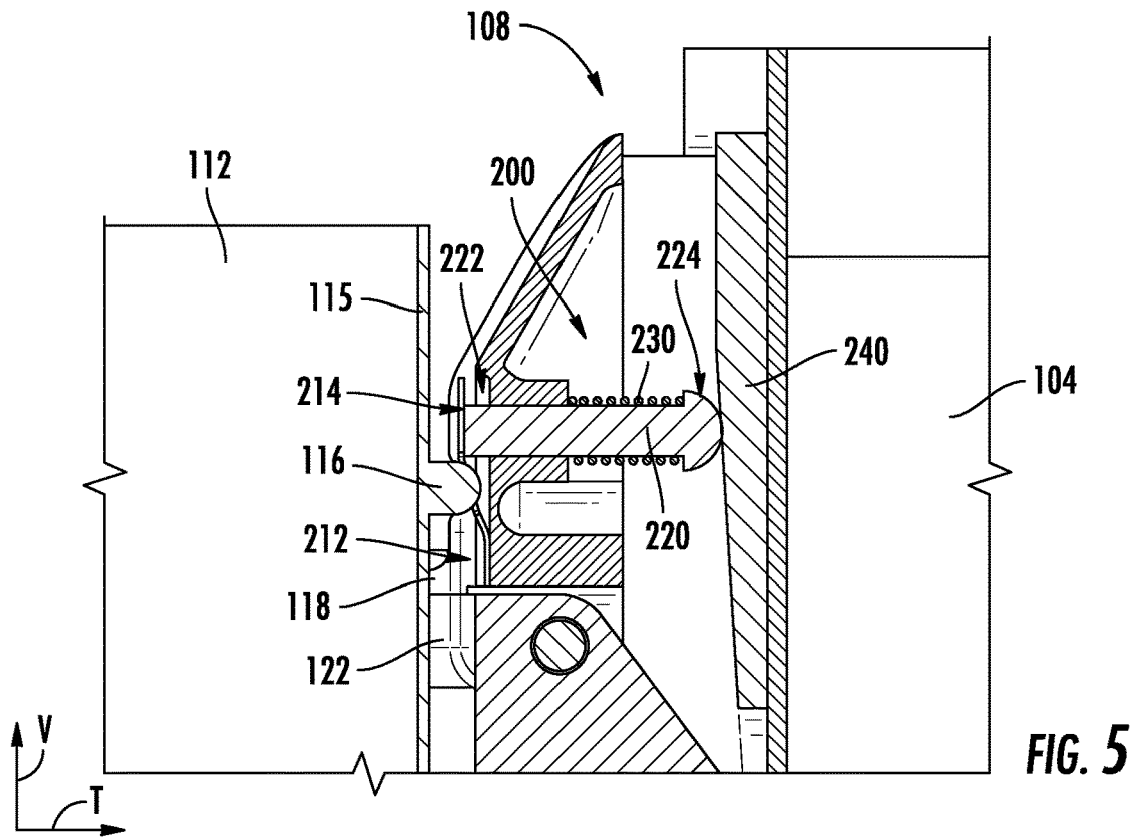
FIG. 5 is a partial, section view of a securing apparatus of the example stand mixer of FIG. 1 in the up or mixing position.
Figure 6:
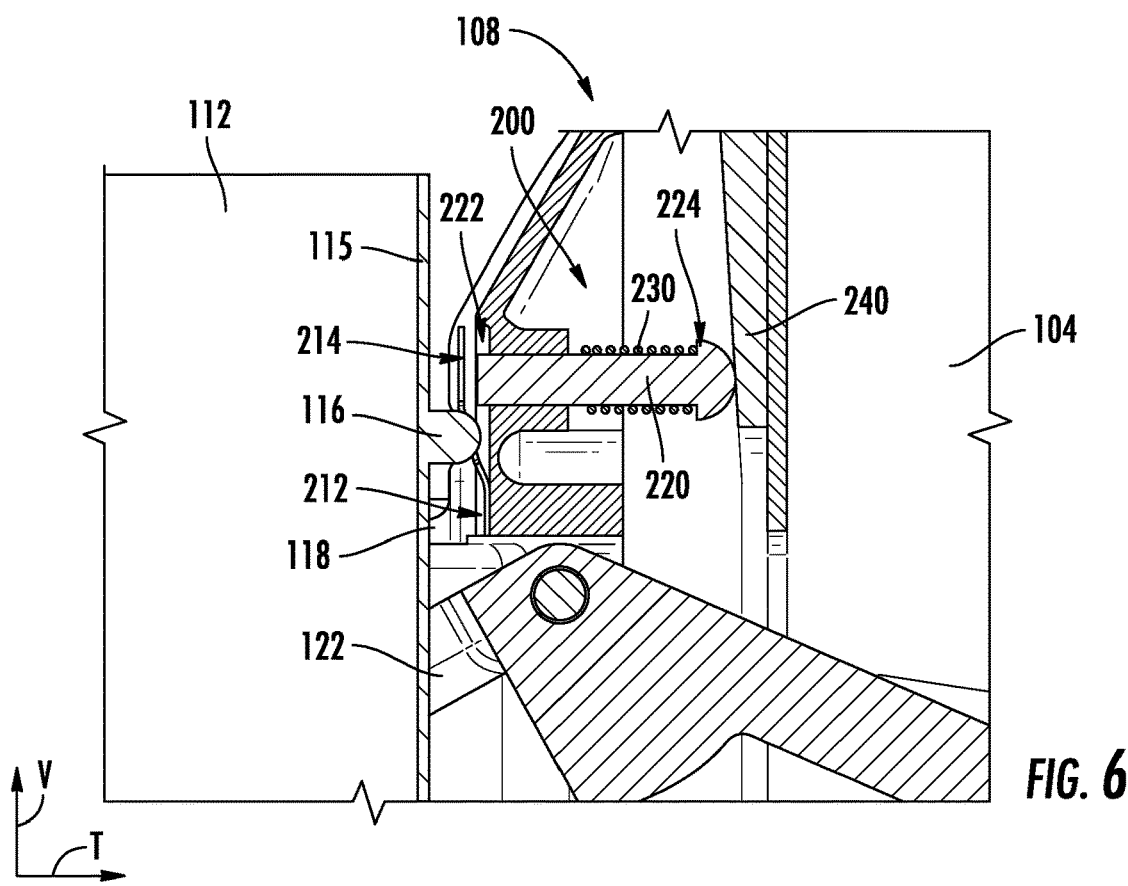
FIG. 6 is a partial, section view of the securing apparatus of the example stand mixer of FIG. 1 in the down or non-mixing position.

Referring now to FIGS. 4, 5 and 6, stand mixer 100 also includes a securing apparatus 200 configured to assist with retaining the bowl 112 on the stand mixer 100. The securing apparatus 200 may include a leaf spring 210 that is mounted to bowl support 108 at a first end portion 222 to the bowl support 108 and that may extend away from the column 104 at a second end portion 214. The second end portion 214 of the leaf spring 210 may define a receiving orifice 216 for receiving a bowl retention protuberance 116 on the bowl 112. In example embodiments, the bowl retention protuberance 116 may be a pin, a fin, a spline, or a post. For instance, as shown in FIGS. 5 and 6, bowl retention protuberance 116 may be a projection formed on a sidewall 115 of bowl 112 and extending radially outward from the sidewall 115, e.g., at or proximate a top of bowl 112. In example embodiments, the receiving orifice 216 may be a through-hole, a depression, or a slot formed in leaf spring 210 at second end portion 214 of the leaf spring 210.

During mounting of bowl 112 on arms 118, a user of stand mixer 100 may push bowl 112 downwardly along the vertical direction V, e.g., such that leaf spring 210 bends or elastically deforms towards column 104 until bowl retention protuberance 116 aligns with receiving orifice 216 at which point leaf spring 210 bends or elastically deforms back to a normal, undeformed state with bowl retention protuberance 116 received within receiving orifice 216. Conversely, to remove bowl 112 from bowl support 108, the user of stand mixer 100 may lift bowl 112 upwardly along the vertical direction V, e.g., such that leaf spring 210 bends or elastically deforms away from column 104 until bowl retention protuberance 116 is removed from receiving orifice 216.

Securing apparatus 200 may assist with retaining the bowl 112 on the bowl support 108. For example, the bowl retention protuberance 116 and the receiving orifice 216 may be shaped complimentary to each other, e.g., such that the bowl retention protuberance 116 and the receiving orifice 216 are adapted to engage with and securely retain the bowl 112 on the bowl support 108. Moreover, when bowl retention protuberance 116 is disposed within receiving orifice 216 as shown in FIGS. 5 and 6, leaf spring 210 may limit or block undesired movement of bowl 112 relative to bowl support 108, such as accidental ejection of bowl 112 from bowl support 108.

As shown in FIGS. 5 and 6, securing apparatus 200 may also include a lock or bolt 220. Bolt 220 may be mounted on bowl support 108, e.g., such that bolt 220 is aligned with second end portion 214 of the leaf spring 210, e.g., along the transverse direction T. As an example, bolt 220 may extend through a slot formed in the bowl support 108. In addition, bolt 220 may extend, e.g., longitudinally, between a first end portion 222 and a second end portion 224. First end portion 222 of bolt 220 may be positioned at and face second end portion 214 of the leaf spring 210. Conversely, second end portion 224 of bolt 220 may be disposed within bowl support 108. Thus, e.g., bolt 220 may extend through the slot formed in the bowl support 108 between the first and second end portions 222, 224 of bolt 220. Bolt 220 may also be translatable relative to bowl support 108. For instance, bolt 220 may be slidable along the transverse direction T within the slot formed in the bowl support 108. In certain example embodiments, bolt 220 may be a pin, a shaft, a latch, etc.

Securing apparatus 200 may further include a retractor 230 and an extender 240. In certain example embodiments, the extender 240 and the retractor 230 are complimentary and operate together to translate the bolt 220 from an unlocked (retracted) position when the bowl support 108 is in the non-mixing position (FIG. 6) to a locked (extended) position when the bowl support 108 is in the mixing position (FIG. 5). For instance, the extender 240 and the retractor 230 may be unitary and components of a single mechanism which translates the bolt 220 as required. As another example, the extender 240 and the retractor 230 may be separate mechanisms which operate together to translate the bolt 220 as required. In certain example embodiments, the retractor 230 may be a spring or a lever, which is configured to translate the bolt 220 away from second end portion 214 of the leaf spring 210 and/or toward the column 104. As a particular example, as shown in FIGS. 5 and 6, retractor 230 may be a spring, such as a coil spring around bolt 220, that urges first end portion 222 of bolt 220 away from leaf spring 210 and/or that urges second end portion 224 of bolt 220 towards extender 240. In certain example embodiments, the extender 240 may be a ramp or a protrusion, e.g., on column 104, which is configured to translate the bolt 220 towards second end portion 214 of the leaf spring 210 and/or away from the column 104. As a particular example, as shown in FIGS. 5 and 6, extender 240 may be ramp that is sloped such that a bottom end of the ramp is disposed further from leaf spring 210 than a top end of the ramp, e.g., along the transverse direction T, and second end portion 224 of bolt 220 may slide along the ramp to translate bolt 220 against the force applied by the coil spring around bolt 220.

In an example operation, in the non-mixing position, the retractor 230 positions the bolt 220 away from the second end portion 214 of the leaf spring 210 and/or toward the column 104. Thus, the second end portion 214 of the leaf spring 210 may bend or elastically deform to allow the user of stand mixer to selectively mount bowl 112 on bowl support 108. Moreover, when the bowl 112 is placed on the bowl support 108 in the non-mixing position (FIG. 3), the arms 118 may hold bowl 112 via mounting spikes 120, which may removably couple to flanges 114. Once the bowl 112 is fully seated on the bowl support 108, the bowl retention protuberance 116 may be received within the receiving orifice 216 on the second end portion 214 of the leaf spring 210 as the leaf spring 210 reverts to a normal, relaxed position. In certain example embodiments, the bowl retention protuberance 116 may be aligned with the second end portion 214 of the leaf spring 210 but may not extend into receiving orifice 216 in the non-mixing position. In other example embodiments, when the bowl 112 is placed on the bowl support 108, the bowl retention protuberance 116 on the bowl 112 initially flexes the second end portion 214 of the leaf spring 210 toward the column 104 as the bowl retention protuberance 116 is translates downwardly along the vertical direction V until the bowl retention protuberance 116 extends into the receiving orifice 216 in the non-mixing position.

When lift lever 122 is actuated, a user rotates lift lever 122 to a horizontal position (FIG. 2). As the bowl 112 moves upwardly along the vertical direction V from base 102 on arms 118, bowl 112 may be positioned closer to head 106 for the mixing position, e.g., to insert an attachment, such as a mixer blade for mixing, a dough hook for kneading, and a balloon whisk for beating, into bowl 112. As the bowl support 108 moves upwardly along the vertical direction V, second end portion 224 of bolt 220 adjacent extender 240 (e.g., the ramp) may ride up the extender 240 such that the bolt 220 is translated along the transverse direction T towards the leaf spring 210 and/or away from the column 104. In certain example embodiments, first end portion 222 of the bolt 220 may be positioned at and/or against the second end portion 214 of the leaf spring 210 in the mixing position. Thus, first end portion 222 of the bolt 220 may block bending or deformation of the second end portion 214 of the leaf spring 210 in the mixing position such that the bowl retention protuberance 116 cannot withdraw from the receiving orifice 216. In other example embodiments, first end portion 222 of the bolt 220 may engage and deform the second end portion 214 of the leaf spring 210 in the mixing position. Moreover, first end portion 222 of the bolt 220 may engage and deform second end portion 214 of the leaf spring 210 into a locked position, in which the bowl retention protuberance 116 is received within and cannot be withdrawn from the receiving orifice 216. In such a manner, the bowl 112 may be securely retained on the bowl support 108 of the stand mixer 100 by the securing apparatus 200 when the bowl support 108 is in the mixing position.

To remove the bowl 112, the bowl support 108 may move downwardly along the vertical direction V when lift lever 122 is actuated downward to the non-mixing position (FIG. 3). The retractor 230 may translate the bolt 220 along the transverse direction T away from second end portion 214 of the leaf spring 210 and/or towards the column 104. Moreover, the second end portion 224 of the bolt 220 adjacent to the extender 240 (e.g., the ramp) may ride back down the extender 240 such that the bolt 220 translates along the transverse direction T away the leaf spring 210 and/or towards the column 104 by the retractor 230. First end portion 222 of the bolt 220 may move away from and/or disengage the second end portion 214 of the leaf spring 210 and allow second end portion 214 of the leaf spring 210 to deform and thus permit removal of the bowl 112 from bowl support 108. In certain example embodiments, first end portion 222 of the bolt 220 may be positioned away and/or spaced apart from the second end portion 214 of the leaf spring 210 in the non-mixing position. Thus, first end portion 222 of the bolt 220 may not block bending or deformation of the second end portion 214 of the leaf spring 210 in the non-mixing position such that the bowl retention protuberance 116 can be withdrawn from the receiving orifice 216. In other example embodiments, first end portion 222 of the bolt 220 may disengage from the second end portion 214 of the leaf spring 210 in the non-mixing position such that the leaf spring 210 reverts to a normal, relaxed, the bowl retention protuberance 116 does not extend into the receiving orifice 216, and the bowl 112 may be removed from the bowl support 108.

As may be seen from the above, the present subject matter may advantageously assist with securing a bowl on arms of the stand mixer, e.g., such that the bowl is not released during operation of the stand mixer. Moreover, a retractable lock, a ramp, and a leaf spring may assist with securing the bowl in an elevated, mixing position. The lock may ride along the ramp until the lock protrudes towards the leaf spring as the arms are lifted towards the elevated, mixing position. The lock may interface with the leaf spring to prevent deformation of the leaf spring, effectively locking the bowl in place. Such securing of the bowl may advantageously provide easy bowl insertion at a lower, non-mixing position bottom while maintaining secure retainment in the elevated, mixing position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A stand mixer, comprising:
   a bowl;
   a column;
   a bowl support mounted to the column such that the bowl support is vertically translatable on the column from a nonmixing position to a mixing position; and
   a securing apparatus configured to retain the bowl on the stand mixer, the securing apparatus comprising
      a leaf spring mounted to the bowl support at a first end portion of the leaf spring, the leaf spring extending away from the column to a second end portion of the leaf spring, the leaf spring defining a receiving orifice at the second end portion of the leaf spring, the receiving orifice configured for receipt of a bowl retention protuberance of the bowl,
      a bolt mounted on the bowl support proximate the second end portion of the leaf spring, the bolt being translatable relative to the leaf spring,
      a retractor configured to translate the bolt away from the second end portion of the leaf spring when the bowl support is in the nonmixing position, and
      an extender configured to translate the bolt toward the second end portion of the leaf spring when the bowl support is in the mixing position, the extender configured to position the bolt such that the bolt blocks deformation of the second end portion of the leaf spring.

2. The stand mixer of claim 1, wherein the receiving orifice comprises one of a through-hole, a depression, and a slot.

3. The stand mixer of claim 1, wherein the bolt comprises a pin.

4. The stand mixer of claim 1, wherein the retractor comprises one of a spring and a lever.

5. The stand mixer of claim 1, wherein the extender comprises one of a ramp and a protrusion mounted to and extending from the column.

6. The stand mixer of claim 1, wherein the retractor comprises a spring, and the extender comprises one of a ramp mounted to and extending from the column.

7. The stand mixer of claim 1, wherein the bowl retention protuberance comprises one or more of a pin, a fin, a spline, and a post.

8. A method for retaining a bowl on a stand mixer, a bowl support of the stand mixer mounted to a column such that the bowl support is vertically translatable on the column from a nonmixing position to a mixing position, a leaf spring of a securing apparatus mounted to the bowl support at a first end portion of the leaf spring, the leaf spring extending away from the column to a second end portion of the leaf spring, the leaf spring defining a receiving orifice at the second end portion of the leaf spring, the receiving orifice configured for receipt of a bowl retention protuberance of the bowl, a bolt of the securing apparatus mounted on the bowl support proximate the second end portion of the leaf spring, the bolt being translatable relative to the leaf spring, the method comprising:
   placing the bowl with the bowl retention protuberance on the bowl support when the bowl support is in the nonmixing position such that the receiving orifice of leaf spring receives the bowl retention protuberance;
   translating the bowl support to the mixing position; and
   as the bowl support translates to the mixing position, engaging an extender such that the bolt translates toward the second end portion of the leaf spring in order and blocks deformation of the second end portion of the leaf spring.

9. The method of claim 8, wherein the receiving orifice comprises one of a through-hole, a depression, and a slot.

10. The method of claim 8, wherein the bowl retention protuberance comprises one or more of a pin, a fin, a spline, and a post.

11. The method of claim 8, wherein the bolt comprises a pin.

12. The method of claim 8, further comprising:
   translating the bowl support from the mixing position back to the nonmixing position; and
   as the bowl support translates to the nonmixing position, engaging a retractor such that the bolt translates away from the second end portion of the leaf spring.

13. The method of claim 12, wherein the retractor comprises one of a spring and a lever.

14. The method of claim 13, wherein the extender comprises one of a ramp and a protrusion mounted to and extending from the column.

15. The method of claim 8, wherein the extender comprises one of a ramp and a protrusion mounted to and extending from the column.

* * * * *